United States Patent
Kwon et al.

(10) Patent No.: US 11,539,099 B2
(45) Date of Patent: Dec. 27, 2022

(54) SLURRY COMPOSITION FOR COATING SECONDARY BATTERY SEPARATOR AND SECONDARY BATTERY SEPARATOR PREPARED USING SAME

(71) Applicant: LG CHEM, LTD., Seoul (KR)

(72) Inventors: Gye Min Kwon, Daejeon (KR); Houng Sik Yoo, Daejeon (KR); Hyeon Choi, Daejeon (KR); Da Kyung Han, Daejeon (KR); Je An Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 318 days.

(21) Appl. No.: 16/765,253

(22) PCT Filed: Dec. 5, 2018

(86) PCT No.: PCT/KR2018/015347
§ 371 (c)(1),
(2) Date: May 19, 2020

(87) PCT Pub. No.: WO2019/112323
PCT Pub. Date: Jun. 13, 2019

(65) Prior Publication Data
US 2020/0358064 A1 Nov. 12, 2020

(30) Foreign Application Priority Data
Dec. 6, 2017 (KR) .................. 10-2017-0166476

(51) Int. Cl.
*H01M 10/0525* (2010.01)
*H01M 50/409* (2021.01)
*H01M 10/0562* (2010.01)
*H01M 50/403* (2021.01)
*H01M 4/02* (2006.01)

(52) U.S. Cl.
CPC ..... *H01M 50/409* (2021.01); *H01M 10/0525* (2013.01); *H01M 10/0562* (2013.01); *H01M 50/403* (2021.01); *H01M 2004/027* (2013.01); *H01M 2004/028* (2013.01); *H01M 2300/0065* (2013.01)

(58) Field of Classification Search
CPC .......... H01M 10/052; H01M 10/0525; H01M 10/0562; H01M 2004/027; H01M 2004/028; H01M 2300/0065; H01M 50/403; H01M 50/409; H01M 50/443; H01M 50/446; H01M 50/449; H01M 50/451; Y02E 60/10
See application file for complete search history.

(56) References Cited

U.S. PATENT DOCUMENTS

| | | |
|---|---|---|
| 2009/0181300 A1 | 7/2009 | Kim |
| 2013/0224556 A1 | 8/2013 | Hong et al. |
| 2013/0330590 A1 | 12/2013 | Toyoda |
| 2014/0227593 A1 | 8/2014 | Lee et al. |
| 2014/0329154 A1 | 11/2014 | Shinoda et al. |
| 2015/0270523 A1 | 9/2015 | Toyoda et al. |
| 2016/0026067 A1 | 1/2016 | Pekala et al. |
| 2016/0090489 A1 | 3/2016 | Hwang et al. |
| 2016/0149209 A1 | 5/2016 | Jeon et al. |
| 2016/0164060 A1 | 6/2016 | Zhang et al. |
| 2018/0019457 A1 | 1/2018 | Alharizah et al. |
| 2018/0198158 A1 | 7/2018 | Lee et al. |

FOREIGN PATENT DOCUMENTS

| | | |
|---|---|---|
| CN | 103408975 A | 11/2013 |
| CN | 106887558 A | 6/2017 |
| CN | 106953051 A | 7/2017 |
| EP | 2 634 841 A1 | 9/2013 |
| JP | 3340538 B2 | 11/2002 |
| JP | 2008-210541 A | 9/2008 |
| JP | 2009-170421 A | 7/2009 |
| JP | 2013-64116 A | 4/2013 |
| JP | 2015-65085 A | 4/2015 |
| JP | 2016-521433 A | 7/2016 |
| JP | 6152161 B2 | 6/2017 |
| KR | 10-2013-0089454 A | 8/2013 |
| KR | 10-2013-0141234 A | 12/2013 |
| KR | 10-2014-0037660 A | 3/2014 |
| KR | 10-2014-0122115 A | 10/2014 |
| KR | 10-1458058 B1 | 11/2014 |
| KR | 10-2014-0136807 A | 12/2014 |
| KR | 10-2015-0003942 A | 1/2015 |
| KR | 10-2016-0061167 A | 5/2016 |
| KR | 10-2016-0092862 A | 8/2016 |
| WO | WO 2014/050708 A1 | 4/2014 |
| WO | WO 2016/090199 A1 | 6/2016 |

(Continued)

OTHER PUBLICATIONS

Machine Translation KR20140037660A (Year: 2014).*
Extended European Search Report for European Application No. 16884920.2, dated Dec. 3, 2020.
Wang et al., "Pyrogallic acid coated polypropylene membranes as separators for lithium-ion batteries". Journal of Materials Chemistry A, vol. 3, Sep. 16, 2015, pp. 20535-20540.
International Search Report for PCT/KR2018/015347 dated Mar. 12, 2019.

* cited by examiner

*Primary Examiner* — Victoria H Lynch
(74) *Attorney, Agent, or Firm* — Birch, Stewart, Kolasch & Birch, LLP

(57) ABSTRACT

A slurry composition for coating a secondary battery separator, a separator prepared using the same, and a secondary battery including the separator, wherein the slurry composition includes a phenolic compound including two or more aromatic rings, inorganic particles, a binder, and a solvent.

13 Claims, No Drawings

(56) References Cited

FOREIGN PATENT DOCUMENTS

| WO | WO 2016/123404 A1 | 8/2016 |
| WO | WO 2017/131377 A1 | 8/2017 |

SLURRY COMPOSITION FOR COATING SECONDARY BATTERY SEPARATOR AND SECONDARY BATTERY SEPARATOR PREPARED USING SAME

CROSS-REFERENCE TO RELATED APPLICATIONS

This application claims the benefit of Korean Patent Application No. 10-2017-0166476, filed on Dec. 6, 2017, in the Korean Intellectual Property Office, the disclosure of which is incorporated herein in its entirety by reference.

TECHNICAL FIELD

Technical Field

The present invention relates to a slurry composition for coating a secondary battery separator and a secondary battery separator prepared using the same, and more specifically, to a slurry composition for coating a secondary battery separator having excellent dispersibility in a slurry composition and excellent adhesion to a separator substrate, and a secondary battery separator prepared using the same.

Background Art

With the recent emerging of environmental issues, interests in new and renewable energy that can replace nuclear power and fossil fuels have increased. Among such new and renewable energy, the demand for secondary batteries having semi-permanent properties that can be repeatedly used by charging and discharging is soaring. Among secondary batteries, a lithium secondary battery is safer and more reliable than other types of batteries, and more price competitive. Recently, in order to improve capacity and specific energy when developing such a lithium secondary battery, research and development on the design of new electrodes and batteries as well as research and development on separators constituting the lithium secondary battery have been actively conducted.

In general, a lithium secondary battery is composed of a positive electrode, a negative electrode, and a separator disposed between the positive electrode and the negative electrode.

The separator constituting the secondary battery electrically blocks the positive electrode and the negative electrode and allows lithium ions to move constantly in an electrolyte of the lithium secondary battery. In general, a separator is prepared by mixing inorganic particles and a binder to prepare a slurry composition and then coating the slurry composition on a substrate followed by drying to form a coating layer on the substrate.

At this time, when the inorganic particles contained in the slurry composition are not properly dispersed, the inorganic particles may agglomerate together, thereby not uniformly coated on the surface of the substrate, resulting in reduced adhesion to the substrate. When the coating layer is formed in the state in which the slurry composition is not properly adhered to the substrate, as charging/discharging progresses, de-intercalation among the inorganic particles and between the inorganic particles and the substrate occurs, so that physical properties of the secondary battery may be deteriorated. Therefore, there have been technologies proposed to prevent the agglomeration among inorganic particles by adding a dispersant to a slurry composition for coating a separator. Typically, a carboxylic acid-based dispersant, a phosphoric acid-based dispersant, and the like have been used as such a dispersant. When the above dispersant is added, the dispersibility of a slurry composition is improved. However, as charging/discharging of a battery is repeated, the adhesion between a coating layer constituting a separator and a substrate is reduced, causing the deterioration in the performance of the battery.

Therefore, there has been a demand for the development of a slurry composition for coating a separator, the composition having excellent dispersibility and excellent adhesion to a separator substrate.

DISCLOSURE OF THE INVENTION

Technical Problem

An aspect of the present invention provides a slurry composition for coating a secondary battery separator, the composition including a phenolic compound including two or more aromatic rings and having excellent particle dispersibility and excellent adhesion to a separator substrate.

Another aspect of the present invention provides a secondary battery separator prepared using the slurry composition and a secondary battery including the secondary battery separator.

Technical Solution

According to an aspect of the present invention, there is provided a slurry composition for coating a secondary battery separator, the composition including a phenolic compound having two or more aromatic rings, inorganic particles, a binder, and a solvent.

According to another aspect of the present invention, there is provided a secondary battery separator including a substrate and a coating layer on a surface of the substrate, wherein the coating layer is formed from the slurry composition for coating a secondary battery separator according to the present invention.

According to yet another aspect of the present invention, there is provided a secondary battery including a positive electrode, a negative electrode, a separator disposed between the positive electrode and the negative electrode, and an electrolyte. At this time, the separator may be the separator according to the present invention.

Advantageous Effects

A slurry composition for coating a secondary battery separator of the present invention includes a phenolic compound having a specific structure, thereby having excellent dispersibility of inorganic particles and excellent adhesion to a separator substrate. Accordingly, when a separator prepared using the slurry composition of the present invention is applied to a secondary battery, mechanical properties such as strength are excellent, and the deterioration in battery performance due to the de-intercalation of inorganic particles during charging and discharging may be prevented.

BEST MODE FOR CARRYING OUT THE INVENTION

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

In the present specification, "%" means wt % unless otherwise noted.

In the present specification, "$D_{50}$" refers to a particle diameter corresponding to 50% of the cumulative amount in a particle diameter distribution curve of particles, and "$D_{90}$" refers to a particle diameter corresponding to 90% of the cumulative amount in a particle diameter distribution curve of particles. The $D_{50}$ and the $D_{90}$ may be measured by, for example, a laser diffraction method.

In the present specification, "specific surface area" is measured by a BET method, and specifically, may be calculated from the adsorption amount of nitrogen gas under a liquid nitrogen temperature (77K) using Belsorp-mino II of BEL Japan Co.

Hereinafter, the present invention will be described in more detail.

Slurry Composition for Coating Secondary Battery Separator

First, a slurry composition for coating a secondary battery separator according to the present invention will be described.

The slurry composition for coating a secondary battery separator according to the present invention includes (1) a phenolic compound including two or more aromatic rings, (2) inorganic particles, (3) a binder, and (4) a solvent.

According to the studies of the present inventors, when a phenolic compound including two or more aromatic rings is used in a slurry composition for coating a separator, the dispersibility of the slurry composition is excellent compared to a slurry composition in which a typical dispersant is used, so that particles of the slurry composition are less likely to agglomerate together. In addition, the settling velocity of the slurry composition is low, and the adhesion thereof to a separator substrate is improved.

Hereinafter, each component of the slurry composition of the present invention will be described in detail.

(1) Phenolic Compound

The phenolic compound is to improve the dispersibility of a slurry composition and the adhesion thereof to a substrate, and is a phenolic compound including two or more aromatic rings.

When a phenolic compound including two or more aromatic rings is used as in the present invention, the agglomeration of particles in slurry is significantly reduced, and as a result, the adhesion to a separator substrate is significantly improved. Such an effect is believed to be due to a bulky structure generated by the two or more aromatic rings and to the influence of a hydroxyl group included in a phenolic group. When a phenolic compound including only one aromatic ring (such as dopamine, gallic acid, pyrogallol, and catechol) is used, there was no sufficient effect of improving dispersibility and increasing adhesion. When a carboxylic acid derivative not including an aromatic ring was used, the dispersibility of a slurry composition was somewhat improved. However, due to poor adhesion to a separator substrate, the de-intercalation of inorganic particles occurred during charging and discharging, so that battery performance was deteriorated.

Meanwhile, it is preferable that the phenolic compound has at least one of a catechol structure and a gallol structure in at least one of the aromatic rings. The catechol structure is a structure in which two hydroxyl groups are coupled to a benzene ring, and the gallol structure is a structure in which three hydroxyl groups are coupled to a benzene ring. The catechol structure and the gallol structure include many hydroxyl groups. Therefore, when such a structure is included in a phenolic compound, the effect of improving the adhesion to a separator substrate are even more excellent.

Specific examples of the phenolic compound that can be used in the present invention may be one or more selected from the group consisting of bicalin, luteolin, taxifolin, myristin, quercetin, rutin, catechin, epigallocatechin gallate, butein, piceatannol and tannic acid, preferably, tannic acid, quercetin or a combination thereof.

Meanwhile, the phenolic compound including two or more aromatic rings may be included in an amount of 1 to 15 parts by weight, preferably 1 to 13 parts by weight, more preferably 2 to 11 parts by weight based on 100 parts by weight of the binder included in the slurry composition. When the phenolic compound including two or more aromatic rings is included in an amount greater than the above range, separator properties may be deteriorated due to the excessive amount of the phenolic compound, and when included in an amount less than the above range, the effect of improving substrate adhesion and dispersibility is insignificant.

(2) Inorganic Particles

Next, the inorganic particles are coated on a separator to increase the strength of the separator. A secondary battery separator prevents the physical contact between a negative electrode and a positive electrode and allows metal ions such as lithium ions to pass therethrough through pores. In general, a polymer film such as a porous polyolefin is used as the separator. However, when a secondary battery separator is composed of only a film formed of an organic material, the separator may be easily damaged by charges of metal particles moving through the separator during the charging/discharging of a secondary battery. Accordingly, in the present invention, a slurry composition containing inorganic particles is coated on a separator substrate formed of a polymer film so as to improve the strength of the separator.

As the inorganic particles, a metal oxide, a metal carbide, a metal alloy, a metal phosphate, a metal nitride, and the like may be used. Specifically, an oxide, a carbide, a nitride, a phosphate, or an alloy, all containing one or more metal elements selected from the group consisting of Al, Ti, Ba, Pb, Zr, Sr, Hf, Li, Zn, Ce, Mg, Ca, Zn, Y, Nb, and Si maybe used, but the inorganic particles are not limited thereto.

According to an embodiment, the inorganic particles may include a single material or a mixture of two or more selected from the group consisting of $BaTiO_3$, $BaTiO_3$, $Pb(Zr,Ti)O_3$ (PZT), $Pb_{1-x}La_xZr_{1-y}Ti_yO_3$ (PLZT) (wherein $0<x<1$, $0<y<1$), $Pb(Mg_{1/3}Nb_{2/3})O_3$—$PbTiO_3$ (PMN-PT), Hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, and a mixture thereof.

According to another embodiment, the inorganic particles may include a compound capable of transferring lithium ions, that is, lithium phosphate ($Li_3PO_4$); lithium titanium phosphate ($Li_pTi_q(PO_4)_3$, wherein $0<p<2$, $0<q<3$); lithium aluminum titanium phosphate ($Li_aAl_bTi_c(PO_4)_3$, wherein $0<a<2$, $0<b<1$, $0<c<3$); $(LiAlTiP)_dO_e$-based glass such as $14Li_2O_9Al_2O_338TiO_239P_2O_5$ (wherein $0<d<4$, $0<e<13$); lithium lanthanum titanate ($Li_eLa_fTiO_3$, wherein $0<e<2$, $0<f<3$); lithium germanium thiophosphate ($Li_gGe_hP_iS_j$, wherein $0<g<4$, $0<h<1$, $0<i<1$, $0<j<5$) such as $Li_{3.25}Ge_{0.25}P_{0.75}S_4$; lithium nitride ($Li_kN_l$, wherein $0<k<4$, $0<l<2$) such as $Li_3N$; $SiS_2$-based glass ($Li_mSi_nS_o$, wherein $0<m<3, 0<n<2, 0<o<4$) such as $Li_3PO_4$—$Li_2S$—$SiS_2$; $P_2S_5$-based glass such as $LiI$—$Li_2S$—$P_2S_5$; or a mixture thereof.

Meanwhile, the inorganic particles have a $D_{50}$ of 0.1-10 µm, preferably 0.2-5 µm, and have a $D_{90}$ of 30 µm or less, preferably 10-25 µm. When the particle diameter of the inorganic particles satisfies the above range, the settling velocity of the inorganic particles is lowered, so that an effect of improving slurry stability may be obtained.

Meanwhile, the inorganic particles may include two kinds of inorganic particles having different specific surface areas (BET). When inorganic particles having different specific surface areas are mixed and used, the storage stability of the slurry composition and the adhesion thereof to a substrate may be further improved.

Specifically, the inorganic particles may include a first inorganic particle having a specific surface area (BET) of less than 10 $m^2/g$, preferably 1-9 $m^2/g$ and a second inorganic particle having a specific surface area (BET) of 10 $m^2/g$ to 30 $m^2/g$, preferably 11-18 $m^2/g$. When the specific surface areas of the first inorganic particle and the second inorganic particles satisfy the above range, an effect of improving the storage stability of the slurry composition and the adhesion thereof to a substrate is excellent.

Meanwhile, the first inorganic particle and the second inorganic particle may be included at a weight ratio (first inorganic particle:second inorganic particle) of 100:0.1-40, preferably 100:5-30, more preferably 100:10-20. When the weight ratio of the first inorganic particle to the second inorganic particles satisfies the above range, the dispersibility of the inorganic particles is even more excellent.

Meanwhile, the inorganic particles may be included in an amount of 0.5 to 40 parts by weight, preferably 5 to 30 parts by weight, more preferably 10 to 20 parts by weight based on 100 parts by weight of the slurry composition for coating a secondary battery separator. When the content of the inorganic particles satisfies the above range, the strength of the separator is excellent, so that the lifespan properties of a secondary battery may be improved.

(3) Binder

Next, the binder is to attach the inorganic particles to the surface of a separator substrate. Any polymer binders used in the art may be used, and the type thereof is not particularly limited.

For example, as the binder, an aqueous or non-aqueous polymer including a single material or a mixture of two or more materials selected from the group consisting of polyvinylidene fluoride (PVdF), polyvinylidene fluoride-hexafluoropropylene, polyvinyl pyrrolidone, polyacrylonitrile, polyvinylidene fluoride-trichlorethylene, polyvinylidene fluoride-chlorotrifluoroethylene (PVdF-CTFE), polymethyl methacrylate, polyvinyl acetate, ethylene-co-vinyl acetate copolymer, polyethylene oxide, cellulose acetate, cellulose acetate butyrate, cellulose acetate propionate, cyanoethylpullulan, cyanoethyl polyvinyl alcohol, cyanoethylcellulose, cyanoethyl sucrose, pullulan, carboxymethylcellulose, acrylonitrile styrene butadiene copolymer, and polyimide. Among the above, polyvinylidene fluoride (PVdF) is particularly preferable.

The binder may be included in an amount of 10-50 parts by weight, preferably 15-45 parts by weight, more preferably 20-40 parts by weight based on 100 parts by weight of the inorganic particles. When the content of the binder satisfies the above range, the adhesion between a coating layer and the separator substrate is excellent.

(4) Solvent

The solvent is to secure coating properties by dispersing the phenolic compound, the inorganic particles, and the binder. It is preferable to use a solvent capable of dissolving the phenolic compound, the inorganic particles, and the binder to a certain level or more, and having non-solvent properties with respect to a substrate on which the slurry composition is coated.

For example, as the solvent, acetone, tetrahydrofuran, acetonitrile, dimethylformamide, dimethylsulfoxide, dimethylacetamide, N-methylpyrrole or water, and the like may be used, and a mixture of two or more thereof may be used.

The solvent may be included in an amount such that the slurry composition has an appropriate viscosity in consideration of the coating properties of the slurry composition. For example, the solvent may be included in an amount of 50-90 parts by weight, preferably 60-85 parts by weight based on 100 parts by weight of the slurry composition.

The slurry composition for a secondary battery separator of the present invention which includes the above components has excellent dispersibility, so that particles are less likely to agglomerate together in the slurry composition and have a low particle settling velocity.

Specifically, the average particle diameter ($D_{50}$) of particles in the slurry composition measured after dispersing the slurry composition for 3 hours at 300 rpm is not more than 2 times, preferably not more than 1.6 times, more preferably not more than 1.2 times the average particle diameter ($D_{50}$) of the inorganic particles.

Meanwhile, when two or more kinds of particles having different average particle diameters ($D_{50}$) are used as the inorganic particles, the average particle diameter ($D_{50}$) of the inorganic particles refers to the average particle diameter ($D_{50}$) of the bigger particles.

In addition, the dispersion may be performed, for example, using an orbital shaker containing zirconia beads having a size of 1 mm.

In addition, the slurry composition according to the present invention may have a particle settling velocity, which is measured in a state in which centrifugal force is applied at a rotational speed of 200 rpm, of 3.5 µm/s or less, preferably 3 µm/s or less, more preferably 1-2.5 µm/s. At this time, the particle settling velocity may be measured using a dispersion analyzer (Product name: Lumisizer, Manufacturer: LUM).

Secondary Battery Separator

Next, a secondary battery separator according to the present invention will be described.

According to an embodiment, the separator of the present invention includes a substrate, and a coating layer positioned on the surface of the substrate and formed of the slurry composition for coating a secondary battery separator, that is, the slurry composition including a phenolic compound including two or more aromatic rings, inorganic particles, a binder, and a solvent.

The substrate serves to prevent the physical contact between a negative electrode and a positive electrode and to allow metal ions such as lithium ions to pass therethrough through pores. Any separators used in a typical secondary battery may be used without particular limitation. Specifically, as the separator, for example, a porous polymer film, non-woven fabric, or a laminated structure of two or more layers thereof may be used, which are made of one or more selected from the group consisting of a polyolefin-based resin, a fluorine-based resin, a polyether-based resin, a polyacrylonitrile resin, and cellulose-based resin. More specifically, the substrate may be a porous polymer film, nonwoven fabric, or a laminated structure of two or more layers thereof, which include one or more components selected from the group consisting of polyethylene, polypropylene, polyvinylidene fluoride, polytetrafluoroethylene, polyethylene terephthalate, and polybutylene terephthalate.

The coating layer is formed by applying the above-described slurry composition according to the present invention on the substrate, following by drying. Since the slurry composition according to the present invention has been described above, a detailed description thereof will be omitted.

The above-described separator according to the present invention has a coating layer including inorganic particles, so that mechanical properties thereof such as strength are excellent. Also, since the adhesion between the coating layer and the substrate is excellent, the de-intercalation of the inorganic particles is less likely to occur, so that the lifespan properties of a secondary battery may be improved. Specifically, the separator has a peel force between the substrate and the coating layer of 180 gf/15 mm or more, so that the adhesion between the coating layer and the substrate is excellent. At this time, the peel force is a force required for separating the substrate and the coating layer. Specifically, the peel force was measured by attaching a double-faced tape to a glass plate, following by attaching the substrate having the coating layer formed thereon such that the surface of the coating layer adheres to the adhesive tape, and then pulling the substrate at a peeling rate of 200 mm/min using Universal Testing Machine (UTM).

Secondary Battery

Next, a secondary battery according to the present invention will be described.

The secondary battery of the present invention includes a positive electrode, a negative electrode, a separator interposed between the positive electrode and the negative electrode, and an electrolyte, wherein the separator is the above-described separator according to the present invention. Since the separator has been described above, the rest of the components will be described hereinafter.

The positive electrode may be manufactured by, for example, applying a positive electrode mixture on a positive electrode current collector, followed by drying and roll-pressing, wherein the positive electrode mixture is prepared by mixing a positive electrode material containing a positive electrode active material with a solvent such as NMP. The positive electrode material may include a positive electrode active material, and selectively, a conductive material, a binder, a filler, and the like.

Any positive electrode active materials well known in the art may be used as the positive electrode active material without limitation. For example, a lithium cobalt-based oxide, a lithium nickel-based oxide, a lithium manganese-based oxide, lithium iron phosphate, a lithium nickel-manganese-cobalt-based oxide, or a combination thereof may be used. Specifically, $LiCoO_2$, $LiNiO_2$, $LiMn_2O_4$, $LiCoPO_4$, $LiFePO_4$, and $LiNi_aMn_bCo_cO_2$ (wherein, $0<a$, $b$, $c<1$) may be used as the positive electrode active material. However, the positive electrode active material is not limited thereto. When the lithium cobalt-based oxide and the lithium metal oxide are used as a positive electrode active material, there are hardly any cracks generated on the surface of active material particles during charging and discharging, so that it is possible to prevent the generation of gas due to a reaction with an electrolyte and prevent the positive electrode active material from being dissolved in the electrolyte due a reaction between a core and an electrolyte-derived fluoride acid.

The conductive material is not particularly limited as long as it has conductivity without causing a chemical change in the battery. Examples of the conductive material may include graphite; a carbon-based material such as carbon black, acetylene black, Ketjen black, channel black, furnace black, lamp black, and thermal black; a conductive fiber such as carbon fiber and metal fiber; metal powder such as fluorocarbon powder, aluminum powder, and nickel powder; a conductive whisker such as zinc oxide and potassium titanate;

a conductive metal oxide such as titanium oxide; or a conductive material such as a polyphenylene derivative, and the like. Specific examples of a commercially available conductive material may include acetylene black series (products of Chevron Chemical Company), denka black (product of Denka Singapore Private Limited, Gulf Oil Company, etc.), ketjen black, EC series (product of Armak Company), Vulcan XC-72 (product of Cabot Company), and Super P (product of Timcal company).

The binder is a component for assisting in bonding of an active material and a conductive material, and in bonding to a current collector, and is typically added in an amount of 1-30 wt % based on the total weight of a mixture including a negative electrode active material layer. Examples of the binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene butylene rubber, fluorine rubber, various copolymers thereof, and the like.

The filler is a component for suppressing the expansion of an electrode, and is used as an optional component. The filler is not particularly limited as long as it is a fibrous material without causing chemical change in the battery. For example, an olefin-based polymer such as polyethylene and polypropylene; or a fibrous material such as glass fiber and carbon fiber may be used.

The negative electrode is manufactured by, for example, applying a negative electrode mixture on a negative electrode current collector, followed by drying and roll-pressing, wherein the negative electrode mixture is prepared by mixing a negative electrode material containing a negative electrode active material with a solvent.

Examples of the negative electrode active material may include one or two or more kinds of negative active materials selected from the group consisting of natural graphite, artificial graphite, a carbonaceous material; a metal (Me) such as a lithium-containing titanium composite oxide (LTO), Si, Sn, Li, Zn, Mg, Cd, Ce, Ni or FE; an alloy composed of the metals (Me); an oxide (Meox) of the metal (Me); and a composite of the metal (Me) and carbon.

The electrolyte refers to an electrolyte used in a secondary battery, the electrolyte composed of an organic solvent having a high dielectric constant and a high viscosity, an organic solvent having a low viscosity, a lithium salt, and the like, and may further include various kinds of additives to improve the performance of a battery. However, the present invention is not limited to using a specific electrolyte. Any electrolytes typically used may be used and the type of electrolyte is not limited.

MODE FOR CARRYING OUT THE INVENTION

Hereinafter, the present invention will be described in detail with reference to examples. However, the following examples are merely illustrative of the present invention and are not intended to limit the scope of the present invention.

EXAMPLE 1

0.1 parts by weight of tannic acid, 11.9 parts by weight of alumina particles having an average particle diameter ($D_{50}$) of 0.5 μm and having a BET surface area of 6 $m^2/g$, 2.1 parts by weight of alumina particles having an average particle diameter ($D_{50}$) of 0.25 μm and having a BET surface area of 20 $m^2/g$, 3.9 parts by weight of a binder in which polyvinylidene fluoride-hexafluoropropylene (PVdF-HFP) and polyvinylidene fluoride-chlorotrifluoroethylene (PVdF-CTFE) are mixed at a mass ratio of 7:3, and 82 parts by weight of an acetone solution were mixed, and the mixture was subjected to mixing using a homomixer (Product name: Dispermat LC, Manufacturer: VMA) for 30 minutes to prepare a slurry composition for coating a separator.

Thereafter, the prepared slurry composition for coating a separator was placed into an orbital shaker (bead size 1 mm), and then subjected to a dispersion process for 3 hours at 300 rpm.

EXAMPLE 2

A slurry composition for coating a separator was prepared in the same manner as in Example 1 except that 0.2 parts by weight of tannic acid and 3.8 parts by weight of the binder were mixed, and the prepared slurry composition was subjected to a dispersion process in the same manner as in Example 1.

EXAMPLE 3

A slurry composition for coating a separator was prepared in the same manner as in Example 1 except that 0.3 parts by weight of tannic acid, 3.7 parts by weight of the binder were mixed, and the prepared slurry composition was subjected to a dispersion process in the same manner as in Example 1.

EXAMPLE 4

A slurry composition for coating a separator was prepared in the same manner as in Example 1 except that 0.4 parts by weight of tannic acid and 3.6 parts by weight of the binder were mixed, and the prepared slurry composition was subjected to a dispersion process in the same manner as in Example 1.

EXAMPLE 5

A slurry composition for coating a separator was prepared in the same manner as in Example 2 except that quercetin was used instead of tannic acid, and the prepared slurry composition was subjected to a dispersion process in the same manner as in Example 1.

COMPARATIVE EXAMPLE 1

A slurry composition for coating a separator was prepared in the same manner as in Example 2 except that a carboxylic acid derivative (Product name: Efka FA 4671, Manufacturer: BASF) was used instead of tannic acid, and the prepared slurry composition was subjected to a dispersion process in the same manner as in Example 1.

COMPARATIVE EXAMPLE 2

A slurry composition for coating a separator was prepared in the same manner as in Example 2 except that a phosphate derivative (Product name: DISPERBYK-145, Manufacturer: BYK) was used instead of tannic acid, and the prepared slurry composition was subjected to a dispersion process in the same manner as in Example 1.

COMPARATIVE EXAMPLE 3

A slurry composition for coating a separator was prepared in the same manner as in Example 2 except that a urethane-based polymer (Product name: Efka PU 4063, Manufacturer: BASF) was used instead of tannic acid, and the prepared slurry composition was subjected to a dispersion process in the same manner as in Example 1.

COMPARATIVE EXAMPLE 4

A slurry composition for coating a separator was prepared in the same manner as in Example 2 except that a hydrogenated nitrile-butadiene copolymer was used instead of tannic acid, and the prepared slurry composition was subjected to a dispersion process in the same manner as in Example 1.

COMPARATIVE EXAMPLE 5

A slurry composition for coating a separator was prepared in the same manner as in Example 2 except that ethylene vinyl alcohol was used instead of tannic acid, and the prepared slurry composition was subjected to a dispersion process in the same manner as in Example 1. However, since ethylene vinyl alcohol was not dissolved in acetone which is a solvent, slurry dispersion was not properly achieved.

COMPARATIVE EXAMPLE 6

A slurry composition for coating a separator was prepared in the same manner as in Example 2 except that polyvinyl pyrrolidone was used instead of tannic acid, and the prepared slurry composition was dispersed in the same manner as in Example 1.

COMPARATIVE EXAMPLE 7

A slurry composition for coating a separator was prepared in the same manner as in Example 2 except that gallic acid was used instead of tannic acid, and the prepared slurry composition was dispersed in the same manner as in Example 1.

COMPARATIVE EXAMPLE 8

A slurry composition for coating a separator was prepared in the same manner as in Example 2 except that pyrogallol was used instead of tannic acid, and the prepared slurry composition was dispersed in the same manner as in Example 1.

EXPERIMENTAL EXAMPLE 1

The average particle diameter (μm) and the particle settling velocity (μm/s) of particles in the slurry composition prepared in each of Examples 1 to 5 and Comparative Examples 1 to 4 and 6 to 8 were measured respectively, and the results are shown in Table 1 below.

The average particle diameter of the particles in each of the slurry compositions was measured using a particle size analyzer (Product name: MASTERSIZER 3000, Manufacturer: Malvern), and the particle settling velocity was measured using a dispersion analyzer (Product name: Lumisizer, Manufacturer: LUM) in a state in which centrifugal force was applied at a rotational speed of 200 rpm.

TABLE 1

|  | Average particle diameter (μm) | Particle settling velocity (μm/s) |
| --- | --- | --- |
| Example 1 | 0.78 | 1.38 |
| Example 2 | 0.49 | 1.21 |
| Example 3 | 0.47 | 1.65 |
| Example 4 | 0.45 | 2.21 |
| Example 5 | 0.54 | 2.3 |
| Comparative Example 1 | 0.53 | 3.62 |
| Comparative Example 2 | 8.71 | 31.59 |
| Comparative Example 3 | 9.2 | 25.0 |
| Comparative Example 4 | 3.97 | 10.78 |
| Comparative Example 6 | 5.85 | 27.15 |
| Comparative Example 7 | 1.07 | 4.32 |
| Comparative Example 8 | 2.12 | 4.51 |

As shown in Table 1, in the case of the slurry composition of each of Examples 1 to 5 in which a phenolic compound including two or more aromatic rings was used, particles in the slurry composition had a small average particle diameter of 1 μm and a low particle settling velocity. Therefore, it can be confirmed that the dispersion was well achieved. However, in the case of the slurry composition of Comparative Example 1 in which a carboxylic acid-based dispersant was used, particles in the slurry composition had a relatively small average particle diameter but a high particle settling velocity. Therefore, the dispersibility was rapidly deteriorated. In the case of the slurry composition of Comparative Example 2 in which a phosphoric acid-based dispersant was used, the slurry composition of Comparative Example 3 in which a urethane-based dispersant was used, the slurry composition of Comparative Example 4 in which a nitrile-butadiene dispersant was used, and the slurry composition of Comparative Example 6 in which a polyvinyl pyrrolidone dispersant was used, the average particle diameter and the settling velocity of particles in all of the slurry compositions were high. Therefore, it can be confirmed that the dispersibility was all poor. Meanwhile, Comparative Examples 7 and 8 in which a phenolic compound including one aromatic ring was used had better slurry dispersibility than Comparative Examples 2 to 6 in which a typical dispersant was used, but had poorer dispersibility than Examples 1 to 5.

EXPERIMENTAL EXAMPLE 2

The slurry composition prepared in each of Examples 1 to 5 and Comparative Examples 1 to 4 and 6 to 8 was applied on a polyethylene porous substrate and then dried at 50° C. to form a coating layer. Thereafter, in order to evaluate the adhesion between the coating layer and the porous substrate, double-sided adhesive tape was attached to a glass plate, and then the porous substrate having the coating layer formed thereon was attached such that the surface of the coating layer adheres to the adhesive tape. Thereafter, the strength (peel force) required for peeling the coating layer from the porous substrate was measured while performing the peeling at 180 degrees at a rate of 200 mm/min using Universal Testing Machine (UTM).

The results of the measurement were rated as ○ when the peel force was 180 gf/15 mm or greater, Δ when the peel force was 100-180 gf/15 mm, and × when the peel force was less than 100 gf/15 mm.

TABLE 2

|  | Substrate adhesion |
| --- | --- |
| Example 1 | ○ |
| Example 2 | ○ |
| Example 3 | ○ |
| Example 4 | ○ |
| Example 5 | ○ |
| Comparative Example 1 | X |
| Comparative Example 2 | X |
| Comparative Example 3 | X |
| Comparative Example 4 | X |
| Comparative Example 6 | X |
| Comparative Example 7 | Δ |
| Comparative Example 8 | Δ |

As shown in Table 2, the coating layer formed of the slurry composition of each of Examples 1 to 5 had more excellent adhesion to the substrate than the coating layer formed of the slurry composition of each of Comparative Examples 1 to 4 and 6 and 8.

The invention claimed is:

1. A slurry composition for coating a secondary battery separator, the slurry composition comprising:
   a phenolic compound including two or more aromatic rings;
   inorganic particles;
   a binder; and
   a solvent; and
   wherein the phenolic compound including two or more aromatic rings is present in an amount of 1 part to 15 parts by weight based on 100 parts by weight of the binder.

2. The slurry composition of claim 1, wherein the phenolic compound including two or more aromatic rings comprises at least one structure selected from the group consisting of a catechol structure and a gallol structure, in at least one of the aromatic rings.

3. The slurry composition of claim 1, wherein the phenolic compound including two or more aromatic rings is one or more selected from the group consisting of bicalin, luteolin, taxifolin, myristin, quercetin, rutin, catechin, epigallocatechin gallate, butein, piceatannol and tannic acid.

4. The slurry composition of claim 1, wherein the inorganic particles comprise first inorganic particles and second inorganic particles, said first and second inorganic particles having different specific surface areas (BET).

5. The slurry composition of claim 4, wherein the first inorganic particles have a specific surface area (BET) of less than 10 m$^2$/g and the second inorganic particles have a specific surface area (BET) of 10 m$^2$/g to 30 m$^2$/g.

6. The slurry composition of claim 1, wherein the inorganic particles have a $D_{50}$ of 0.1 μm to 10 μm.

7. The slurry composition of claim 1, wherein the inorganic particles have a $D_{90}$ of 30 μm or less.

8. The slurry composition of claim 1, wherein the binder is present in an amount of 10 parts to 50 parts by weight based on 100 parts by weight of the inorganic particles.

9. The slurry composition of claim 1, wherein the average particle diameter ($D_{50}$) of all particles in the slurry composition measured after dispersing the slurry composition for 3 hours at 300 rpm is not more than 2 times the average particle diameter ($D_{50}$) of the inorganic particles.

10. The slurry composition of claim 1, wherein the particle settling velocity of the slurry composition measured in a state in which centrifugal force is applied to the slurry composition at a rotational speed of 200 rpm is 3 µm/s or less.

11. A secondary battery separator comprising:
a substrate; and
a coating layer on a surface of the substrate, wherein the coating layer is formed from the slurry composition of claim 1.

12. The secondary battery separator of claim 11, wherein the separator has a peel force between the substrate and the coating layer of 180 gf/15 mm or greater.

13. A secondary battery comprising:
a positive electrode;
a negative electrode;
the separator according to claim 11 disposed between the positive electrode and the negative electrode; and
an electrolyte.

* * * * *